(12) United States Patent
Chen et al.

(10) Patent No.: US 7,632,881 B2
(45) Date of Patent: Dec. 15, 2009

(54) POLYCARBONATE COMPOSITIONS AND ARTICLES FORMED THEREFROM

(75) Inventors: Jing Chen, MinHang District (CN); Hua Jiao, Shijiazhuang (CN); Yegang Lin, Pudong New District (CN); Jingwu Yang, Jing An District (CN); XinMin Yang, Shanghai (CN)

(73) Assignee: SABIC Innovative Plastics IP B.V. (NL)

( * ) Notice: Subject to any disclaimer, the term of this patent is extended or adjusted under 35 U.S.C. 154(b) by 215 days.

(21) Appl. No.: 11/425,802

(22) Filed: Jun. 22, 2006

(65) Prior Publication Data

US 2007/0299174 A1 Dec. 27, 2007

(51) Int. Cl.
C08K 5/42 (2006.01)
C08K 5/41 (2006.01)
C08G 18/42 (2006.01)
(52) U.S. Cl. .................. 524/158; 524/500; 524/170
(58) Field of Classification Search .............. 524/500, 524/158, 170
See application file for complete search history.

(56) References Cited

U.S. PATENT DOCUMENTS

| | | | |
|---|---|---|---|
| 3,671,487 A | 6/1972 | Abolins | |
| 3,723,373 A | 3/1973 | Lucas | |
| 3,775,367 A | 11/1973 | Krefeld | |
| 3,971,756 A | 7/1976 | Bialous et al. | |
| 4,028,297 A | 6/1977 | Webb | |
| 4,110,299 A | 8/1978 | Mark | |
| 4,130,530 A | 12/1978 | Mark et al. | |
| 4,303,575 A | 12/1981 | Reinert | |
| 4,335,038 A | 6/1982 | Thomas | |
| 4,552,911 A | 11/1985 | Cohnen et al. | |
| 4,916,194 A | 4/1990 | Policastro et al. | |
| 5,218,027 A | 6/1993 | Smith et al. | |
| 5,380,795 A * | 1/1995 | Gosens et al. ............. | 525/67 |
| 5,508,323 A | 4/1996 | Romenesko et al. | |
| 5,783,620 A * | 7/1998 | Hamashima et al. ........ | 524/405 |
| 6,103,837 A * | 8/2000 | Hiiro et al. ............. | 525/464 |
| 6,353,046 B1 | 3/2002 | Rosenquist et al. | |
| 6,613,824 B2 | 9/2003 | Campbell et al. | |
| 6,630,525 B2 * | 10/2003 | Cella et al. ............. | 524/100 |
| 6,657,018 B1 | 12/2003 | Hoover | |
| 6,727,302 B2 * | 4/2004 | Goossens et al. .......... | 524/161 |
| 6,790,899 B2 | 9/2004 | Singh et al. | |
| 6,921,785 B2 * | 7/2005 | Campbell et al. .......... | 524/127 |
| 6,946,537 B2 * | 9/2005 | Krafczyk et al. .......... | 528/42 |
| 7,147,671 B2 * | 12/2006 | Butts et al. ............. | 8/196 |
| 7,169,859 B2 * | 1/2007 | Davis et al. ............ | 525/437 |
| 7,223,804 B2 * | 5/2007 | An et al. .............. | 524/165 |
| 7,279,223 B2 * | 10/2007 | Rubinsztajn et al. ....... | 428/414 |
| 2004/0158090 A1 * | 8/2004 | Krafczyk et al. .......... | 556/457 |
| 2004/0242768 A1 * | 12/2004 | Butts et al. ............. | 524/860 |
| 2005/0009968 A1 | 1/2005 | Singh et al. | |
| 2005/0085580 A1 * | 4/2005 | Marugan et al. ........... | 524/431 |
| 2005/0182165 A1 * | 8/2005 | Ma et al. .............. | 524/115 |
| 2005/0228137 A1 * | 10/2005 | Srinivasan et al. ........ | 525/186 |
| 2006/0030647 A1 | 2/2006 | Ebeling et al. | |
| 2006/0142421 A1 * | 6/2006 | Ihara et al. ............. | 523/205 |
| 2007/0191518 A1 | 8/2007 | Chen et al. | |
| 2007/0191519 A1 * | 8/2007 | Jiao et al. ............. | 524/156 |

FOREIGN PATENT DOCUMENTS

KR 20030046906 A 6/2003

OTHER PUBLICATIONS

SF1555 Data Sheet.*
PCT International Search Report for International Application No. PCT/US2007/069227.

* cited by examiner

*Primary Examiner*—Mark Eashoo
*Assistant Examiner*—Noah Frank

(57) ABSTRACT

A polycarbonate composition is disclosed having zero or minimum halogen content, while also exhibiting improved fire-retardance and/or drip-resistant characteristics. The composition comprises an effective amount of a polycarbonate, an anti-dripping agent, an aromatic sulfone sulfonate, an aromatic sulfonate, a synergistic combination of an elastomer-modified graft copolymer and a polysiloxane-polycarbonate copolymer, and an optional siloxane oligomer. The polycarbonate composition is useful for manufacture of electronic and mechanical articles, among others.

27 Claims, No Drawings

POLYCARBONATE COMPOSITIONS AND ARTICLES FORMED THEREFROM

BACKGROUND

This disclosure relates, in various exemplary embodiments, to polycarbonate compositions and articles formed from such compositions having little to no halogen content, and improved fire-retardance and/or drip-resistant characteristics, as well as uses thereof.

With their strength and clarity, polycarbonate (PC) resins have a great many significant commercial applications Unfortunately, polycarbonate resins are inherently not very flame resistant and hence, when burning, can drip hot molten material causing nearby substances to catch fire as well. Thus, in order to safely utilize polycarbonates in many commercial applications, it is necessary to include additives which further retard the flammability of the material and/or which reduce dripping.

A variety of different materials have been described for use in producing fire-retardance (FR) and/or drip-resistant polycarbonates. Examples of these materials include those described in U.S. Pat. Nos. 3,971,756; 4,028,297; 4,110,299; 4,130,530; 4,303,575; 4,335,038; 4,552,911; 4,916,194; 5,218,027; and, 5,508,323.

Flame retardance additives utilized today typically include various sulfonate salts, phosphorous acid esters, brominated and/or chlorinated flame retardants, etc. However, the phosphate additives, which are used at relatively high loadings (i.e. greater than 5 percent, and around 10 percent to produce similar UL94 V0 performance), will deteriorate overall material mechanical performance. Additionally, brominated and chlorinated additives, and even some fluorinated additives at certain loadings, are prohibited by various Non-Government Organizations (NGO's) and environmental protection rules, such as Blue Angel, TCO'99, DIN/VDE, etc. Consequently, sulfonate salts are very widely used today as flame retardance additives.

Examples of sulfonate salt flame retardance additives include perfluoroalkane sulfonates, such as potassium perfluorobutane sulfonate ("KPFBS", also known as "Rimar salt"). Another sulfonate salt flame retardance additive is, for example, potassium diphenylsulfone sulfonate ("KSS").

In this regard, the use of perfluoroalkane sulfonates in polycarbonate resins is described in U.S. Pat. No. 3,775,367. Additionally, U.S. Pat. No. 6,353,046 discloses that improved fire properties can be imparted to polycarbonate resin compositions by incorporating into the polycarbonate, potassium perfluorobutane sulfonate, and a cyclic siloxane, such as octaphenylcyclotetrasiloxane. U.S. Pat. No. 6,790,899 specifies the finding of a synergistic effect between KPFBS and sodium salt of toluene sulfonic acid (NaTS) on flame retardant polycarbonate compositions. Moreover, U.S. Patent Application 20050009968 teaches the synergistic effect between KPFBS and a number of inorganic sodium salts in transparent flame retardant carbonate compositions. Nevertheless, KPFBS contains fluorine and therefore is not Blue Angel conforming.

When thinner wall flame retardant performance is desired, a fluoro-containing anti-dripping additive may be utilized. However, to meet the Eco label requirements, only limited loading of the fluoro-containing anti-dripping additive can be used. For example, DIN/VDE requires a fluorine content of no more than 0.1 percent. However, the anti-dripping effect with this limited amount of fluoro-containing anti-dripping additive is generally poor. For example, when using a KSS/NaTS combination as the flame retardant package and TSAN as the anti-dripping additive at the DIN/VDE required loading, one cannot obtain a polycarbonate composition exhibiting a UL94 V0 @ 1.5 mm rating.

Furthermore, only limited fire-retardance performance can be obtained when KSS is used alone. The conventional means for enhancing the fire-retardancy properties while retaining transparency has been through the use of soluble organic halogen additives with KSS. For example, in some polycarbonate resin compositions, KSS with a loading of 0.3-0.5 phr is used with brominated polycarbonate. Without the bromine, those compositions have inconsistent/unreliable performance in the UL94 V0 @ 3.0 mm flammability test that these compositions are designed to meet.

There accordingly remains a need in the art for polycarbonate compositions containing minimal or no halogen that can readily produce an article with improved fire-retardance and/or drip-resistant characteristics, among others.

SUMMARY

A composition is disclosed herein having zero or minimum halogen content and enhanced fire-retardance and/or drip-resistant properties. The composition comprises an effective amount of a polycarbonate, an anti-drip agent, an aromatic sulfone sulfonate, an aromatic sulfonate, and a synergistic combination of an elastomer-modified graft copolymer and a polysiloxane-polycarbonate copolymer, optionally in the presence of a siloxane oligomer to produce the properties desired. Preferably, the anti-drip agent contains little or no halogen. The polycarbonate composition is useful for manufacture of articles, such as molded or extruded electronic and mechanical parts, among others.

In another aspect, a flame retardant composition is disclosed comprising an effective amount of a polycarbonate, an anti-drip agent containing a minimal amount of fluorine, an aromatic sulfone sulfonate, an aromatic sulfonate, and a synergistic combination of an elastomer-modified graft copolymer and a polysiloxane-polycarbonate copolymer, optionally in the presence of a siloxane oligomer, to produce an article having a UL 94 flammability V0 rating at 1.2 mm or thicker.

In a further aspect, the present disclosure provides a composition, such as a thermoplastic composition, that has zero or minimum halogen content, and improved fire-retardance and/or drip-resistant characteristics. The composition comprises (i) 100 parts by weight of polycarbonate; (ii) from about 0 to about 0.26 parts of an anti-drip agent; (iii) from about $1 \times 10^{-4}$ parts to about 0.1 parts by weight of an aromatic sulfone sulfonate; (iv) from about $1 \times 10^{-5}$ parts to about 0.1 parts by weight of an aromatic sulfonate; (v) from about 0.1 parts to about 10 parts by weight of an elastomer-modified graft copolymer; (vi) from about 0.1 parts to about 12 parts by weight of a polysiloxane-polycarbonate copolymer, and (vii) optionally from about 0.1 parts to about 5 parts by weight of a siloxane oligomer; wherein the fluorine content from the component (ii) anti-dripping agent is less than about 0.1 percent by weight based on the total weight of the composition.

In still another aspect, the present disclosure provides an article manufactured from the noted compositions, such as an electronic or a mechanical part. For example, the compositions can be utilized to produce a molded or extruded flame retardant article having the flame retardance performance of UL 94 V0 rating at a thickness of 1.2 mm.

These and other non-limiting features and/or characteristics of the embodiments of the present disclosure are more particularly exemplified by the following detailed description.

DETAILED DESCRIPTION

Disclosed herein is a polycarbonate composition containing zero or minimum halogen content, which comprises an anti-drip agent, an aromatic sulfone sulfonate, an aromatic sulfonate, and a synergistic combination of an elastomer-modified graft copolymer and a polysiloxane-polycarbonate copolymer, optionally in the presence of a siloxane oligomer. The polycarbonate composition exhibits particular desirable properties such as improved fire-retardance and/or drip-resistant characteristics, among others.

As used herein, the term "polycarbonate" refers to a polymer comprising the same or different carbonate units, or a copolymer that comprises the same or different carbonate units, as well as one or more units other than carbonate (i.e. copolycarbonate); the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "aromatic radical" refers to a radical having a valence of at least one comprising at least one aromatic group; examples of aromatic radicals include phenyl, pyridyl, furanyl, thienyl, naphthyl, and the like; "arylene" refers to a benzene ring diradical or to a benzene ring system diradical fused to at least one optionally substituted benzene ring; "acyl" refers to a monovalent hydrocarbon radical joined to a carbonyl carbon atom, wherein the carbonyl carbon further connects to an adjoining group; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; the modifier "about" used in connection with a quantity is inclusive of the stated value and has the meaning dictated by the context (e.g., includes the degree of error associated with measurement of the particular quantity); "optional" or "optionally" means that the subsequently described event or circumstance may or may not occur, and that the description includes instances where the event occurs and instances where it does not; and "direct bond", where part of a structural variable specification, refers to the direct joining of the substituents preceding and succeeding the variable taken as a "direct bond".

Compounds are described herein using standard nomenclature. A dash ("-") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another.

The composition comprises effective amounts of components to produce enhanced fire-retardance and/or drip-resistant with a substantially low, or no, halogen content. In one embodiment, the disclosure provides a flame retardance (FR) composition such as a thermoplastic composition, which comprises:

(i) 100 parts by weight of polycarbonate;
(ii) from about 0 to about 0.26 parts of an anti-drip agent;
(iii) from about $1 \times 10^{-4}$ parts to about 0.1 parts by weight of an aromatic sulfone sulfonate;
(iv) from about $1 \times 10^{-5}$ parts to about 0.1 parts by weight of an aromatic sulfonate;
(v) from about 0.1 parts to about 10 parts by weight of an elastomer-modified graft copolymer;
(vi) from about 0.1 parts to about 12 parts by weight of a polysiloxane-polycarbonate copolymer; and
(vii) optionally from about 0.1 parts to about 5 parts by weight of a siloxane oligomer;
wherein the halogen content from the anti-drip agent is less than about 0.1 percent by weight based on the total weight of the composition.

In an embodiment, when a fluoro-containing anti-drip agent is utilized, it increases the melt strength of the polycarbonate, thereby reducing the tendency of the resin, when heated close to melting, to drip. Examples of suitable fluoro-containing anti-drip agents include fluoropolymer-based anti-drip agents. Suitable fluoropolymers and methods for making such fluoropolymers are known, such as for example, U.S. Pat. Nos. 3,671,487 and 3,723,373. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Suitable fluorinated alpha-olefin monomers include, e.g., fluoroethylenes such as, tetrafluoroethylene, trifluoroethylene, 1,1-difluoroethylene, fluoroethylene, 1,1-difluoro-2-chloroethylene, 1,1-difluoro-1,1-dichloroethylene, 1,2-difluoro-1,2-dichloroethylene, 1-fluoro-2,2-dichloroethylene, 1-chloro-1-fluoroethylene, and 1,1,2-trichloro-2-fluoroethylene; and fluoropropylenes, such as e.g., hexafluoropropylene, 1,1,1,3-tetrafluoropropylene, 1,1,1,3,3-pentafluoropropylene, and 1,1,1,2-tetrafluoropropylene. In other embodiments, suitable fluorinated alpha-olefin copolymers include copolymers comprising structural units derived from two or more fluorinated alpha-olefin copolymers such as, e.g., poly(tetrafluoroethylene-hexafluoropropylene), and copolymers comprising structural units derived from one or more fluorinated monomers and one or more non-fluorinated monoethylenically unsaturated monomers that are copolymerizable with the fluorinated monomers such as, e.g., poly(tetrafluoroethylene-ethylene-propylene) copolymers. Suitable non-fluorinated monoethylenically unsaturated monomers include e.g., alpha-olefin monomers such as, e.g., ethylene, propylene, butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, and vinyl versatate. The fluoropolymer can be incorporated in the composition by any of the methods known in the art, such as those disclosed in U.S. Pat. No. 6,613,824, issued Sep. 2, 2003.

In a still further embodiment, the fluoropolymer is used in a minimal amount in the form of encapsulated fluoropolymer. A specific encapsulated fluoropolymer is a styrene-acrylonitrile copolymer encapsulated polytetrafluoroethylene (PTFE), or Teflon™ grafted styrene-acrylonitrile copolymer (TSAN). TSAN can be made by copolymerizing styrene and acrylonitrile in the presence of an aqueous dispersion/emulsion of Teflon™ so as to produce partially SAN-encapsulated Teflon™ particles. TSAN can, for example, comprise about 50 weight percent PTFE and about 50 weight percent styrene-acrylonitrile copolymer, based on the total weight of the encapsulated fluoropolymer. The styrene-acrylonitrile copolymer can, for example, be from about 75 weight percent styrene to about 25 weight percent acrylonitrile based on the total weight of the copolymer. TSAN offers significant advantages over polytetrafluoroethylene, namely TSAN is more readily dispersed in the composition. The TSAN particles typically have a particle size of about 35 to about 70 micrometers, and specifically about 40 to about 65 micrometers.

In another embodiment, the content of halogen, such as fluorine (F), is controlled to be less than about 0.1 percent by weight, based on the total weight of the flame retardant composition, in order to comply with some ECO regulations, such as DIN/VDE.

Although the amount of aromatic sulfone sulfonate in this embodiment is generally from about $1 \times 10^{-4}$ parts to about 0.1 parts by weight, specifically it can be from about $5 \times 10^{-4}$ parts to about $7 \times 10^{-2}$ parts by weight, and more specifically it can be from about $4 \times 10^{-3}$ parts to about $3.5 \times 10^{-2}$ parts by weight.

In an embodiment, the aromatic sulfone sulfonate comprises a formula (K-1) compound:

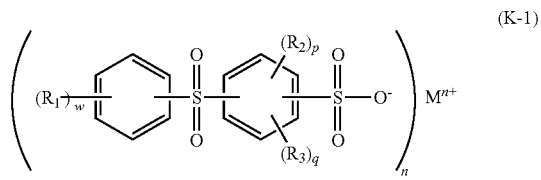

(K-1)

wherein $R_1$, $R_2$, and $R_3$ are independently selected from a $C_1$-$C_6$ alkyl group such as methyl and ethyl; M is a metal such as sodium or potassium; n is an integer and $1 \leq n \leq 3$; w is an integer and $0 \leq w \leq 5$; p and q are integers, $p \geq 0$, $q \geq 0$, and $p+q \leq 4$.

For example, in formula (K-1), M may be potassium, n=1, and w=p=q=0. The component (ii) of the thermoplastic composition is therefore potassium diphenylsulfone sulfonate (KSS), e.g. a formula (K-2) compound:

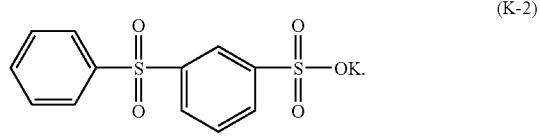

(K-2)

Although the amount of aromatic sulfonate in this embodiment is generally from about $1 \times 10^5$ parts to about 0.1 parts by weight, specifically it can be from about $5 \times 10^5$ parts to about $5 \times 10^{-2}$ parts by weight, and more specifically it can be from about $8 \times 10^{-5}$ parts to about $2 \times 10^{-3}$ parts, such as about $1 \times 10^{-4}$ parts by weight.

In one embodiment, the aromatic sulfonate comprises a formula (N-1) compound:

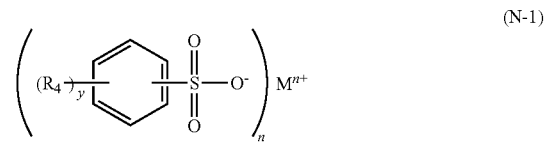

(N-1)

wherein $R_4$ is selected from a $C_1$-$C_6$ alkyl group such as methyl and ethyl; M is a metal such as sodium or potassium; n is an integer and $1 \leq n \leq 3$; y is an integer and $0 \leq y \leq 5$.

For example, in formula (N-1), $R_4$ may be a p-methyl group, M may be sodium, n=1, and y=1. The component (iii) of the thermoplastic composition may therefore be a formula (N-2) compound, or a sodium salt of toluene sulfonic acid (NaTS):

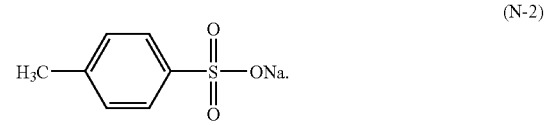

(N-2)

In a particular embodiment, KSS and NaTS are be premixed in a suitable solvent such as water, and then formulated into the composition in accordance with the disclosure.

Although the amount of elastomer-modified graft copolymer in this embodiment is generally from about 0.1 parts to about 10 parts by weight, specifically it can be from about 0.5 parts to about 5 parts by weight, and more specifically it can be from about 1 part to about 2.5 parts, such as 1, 1.5, 2, and 2.5 parts by weight.

The elastomer-modified graft copolymers may comprise (i) an elastomeric (i.e., rubbery) polymer substrate having a Tg less than 10° C., more specifically less than −10° C., or more specifically −40° to −85° C., and (ii) a rigid polymeric substrate grafted to the elastomeric polymer substrate.

The elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 weight percent of a copolymerizable monomer; elastomeric copolymers of $C_{1-8}$ alkyl (meth)acrylate with conjugated diene; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl (meth)acrylates with butadiene and/or styrene; or combinations comprising at least one of the foregoing elastomers.

Suitable conjugated diene monomers for preparing the elastomer phase are of formula (E-1):

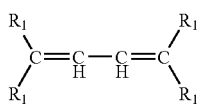
(E-1)

wherein each $R_1$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Vinyl aromatic compounds may be copolymerized with the ethylenically unsaturated nitrile monomer to form a copolymer, wherein the vinylaromatic compounds can include monomers of formula (E-2):

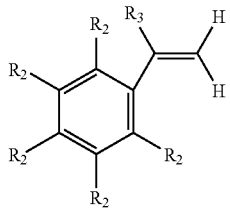
(E-2)

wherein each $R_2$ is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and $R_3$ is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (E-3):

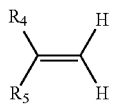
(E-3)

wherein $R_4$ is hydrogen, $C_1$-$C_5$ alkyl, bromo, or chloro, and $R_5$ is $C_1$-$C_{12}$ alkoxycarbonyl, $C_1$-$C_{12}$ aryloxycarbonyl, hydroxy carbonyl, or the like. Examples of monomers of formula (E-3) include, acrylic acid, methyl(meth)acrylate, ethyl(meth)acrylate, n-butyl(meth)acrylate, t-butyl (meth) acrylate, n-propyl(meth)acrylate, isopropyl(meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

(Meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 weight percent of comonomers of formulas (E-1), (E-2), or (E-3). Exemplary comonomers include but are not limited to butadiene, isoprene, styrene, methyl methacrylate, phenyl methacrylate, penethylmethacrylate, N-cyclohexylacrylamide, vinyl methyl ether, and mixtures comprising at least one of the foregoing comonomers. Optionally, up to 5 weight percent of a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of 0.001 to 25 micrometers, including 0.01 to 15 micrometers, or even more specifically 0.1 to 8 micrometers may be used for emulsion based polymerized rubber lattices. A particle size of 0.5 to 10 micrometers, such as 0.6 to 1.5 micrometers may be used for bulk polymerized rubber substrates. Particle size may be measured by simple light transmittance methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70 weight percent. Also suitable are mixtures of butadiene with styrene and/or $C_{4-6}$ alkyl acrylate rubbers.

The elastomeric phase may provide 5 to 95 weight percent of the total graft copolymer, more specifically 20 to 90 weight percent, and even more specifically 40 to 85 weight percent of the elastomer-modified graft copolymer, the remainder being the rigid graft phase.

The rigid phase of the elastomer-modified graft copolymer may be formed by graft polymerization of a mixture comprising a (meth)acrylate monomer and optionally monovinylaromatic monomer in the presence of one or more elastomeric polymer substrates. The above-described monovinylaromatic monomers of formula (E-2) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (E-3). In one embodiment, $R_4$ is hydrogen or $C_1$-$C_2$ alkyl, and $R_5$ is cyano or $C_1$-$C_{12}$ alkoxycarbonyl. Specific examples of suitable comonomers for use in the rigid phase include, methyl (meth)acrylate, ethyl(meth)acrylate, n-propyl(meth)acrylate, isopropyl(meth)acrylate, and the like, and combinations comprising at least one of the foregoing comonomers.

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 to 95 weight percent elastomer-modified graft copolymer and 5 to 60 weight percent graft (co)polymer, based on the total weight of the impact modifier. In another embodiment, such impact modifiers comprise 50 to 85 weight percent, more specifically 75 to 85 weight percent rubber-modified graft copolymer, together with 15 to 50 weight percent, more specifically 15 to 25 weight percent graft (co)polymer, based on the total weight of the impact modifier.

Another specific type of elastomer-modified impact modifier comprises structural units derived from at least one silicone rubber monomer, a branched acrylate rubber monomer having the formula $H_2=C(R_d)C(O)OCH_2CH_2R_e$, wherein $R_d$ is hydrogen or a $C_1$-$C_8$ linear or branched alkyl group and $R_e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable, alkenyl-containing organic material may be, for example, a monomer of formula (E-2) or (E-3), e.g., styrene, alpha-methylstyrene, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl) (dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and tetraethoxyorthosilicate may be reacted with a first graft link monomer such as (gamma-methacryloxypropyl) methyldimethoxysilane, to afford silicone rubber having an average particle size from 100 nanometers to 2 micrometers. At least one branched acrylate rubber monomer is then polymerized with the silicone rubber particles, optionally in the presence of a cross linking monomer, such as allylmethacrylate and/or in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to 2 micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

The foregoing types of impact modifiers, including SAN copolymers, can be prepared by an emulsion polymerization process that is free of basic materials such as alkali metal salts of $C_{6-30}$ fatty acids, for example sodium stearate, lithium stearate, sodium oleate, potassium oleate, and the like; alkali metal carbonates, amines such as dodecyl dimethyl amine, dodecyl amine, and the like; and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$, alkylaryl phosphates, substituted silicates, and mixtures thereof. A specific surfactant is a $C_{6-16}$, specifically a $C_{8-12}$ alkyl sulfonate. In the practice, any of the above-described impact modifiers may be used providing it is free of the alkali metal salts of fatty acids, alkali metal carbonates and other basic materials.

In an embodiment, the elastomer-modified graft copolymer is a methyl methacrylate-butadiene-styrene (MBS) impact modifier. Other examples of elastomer-modified graft copolymers besides MBS include but are not limited to acrylonitrile-butadiene-styrene (ABS), acrylonitrile-styrene-butyl acrylate (ASA), methyl methacrylate-acrylonitrile-butadiene-styrene (MABS), and acrylonitrile-ethylene-propylene-diene-styrene (AES).

In an embodiment, the elastomer-modified graft copolymer comprises a rubbery polymer substrate and a rigid polymer grafted to the rubbery polymer substrate. The rubbery polymer substrate comprises an elastomeric copolymer of $C_{1-8}$ alkyl(meth)acrylate with a conjugated diene; and the rigid polymer comprises a polymer of monovinylaromatic monomers. The elastomer-modified graft copolymer may also be commercially obtained. In an embodiment, a MBS copolymer may be obtained from Rohm & Haas under the trade name of Paraloid™ EXL2691A, which is stabilized MBS with neutral pH.

Although the amount of polysiloxane-polycarbonate copolymer is generally from about 0.1 parts to about 12 parts by weight, specifically it can be from about 0.5 parts to about 6 parts by weight, and more specifically it can be from about 1 part to about 3 parts, such as 1, 1.5, 2, and 3 parts by weight.

Furthermore, the amount of siloxane in the entire polycarbonate composition is from about 2 weight percent to about 30 weight percent, including from about 15 weight percent to about 25 weight percent.

The polycarbonate composition comprises a polysiloxane-polycarbonate or polycarbonate-polysiloxane (PC-Si) copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (S-1):

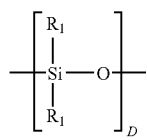
(S-1)

wherein each occurrence of $R_1$ is the same or different, and is a $C_{1-13}$ monovalent organic radical. For example, $R_1$ may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing $R_1$ groups may be used in the same copolymer.

The value of D in formula (S-1) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (S-2):

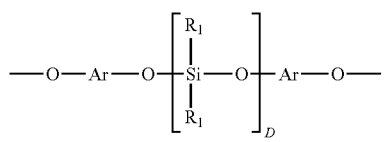
(S-2)

wherein D is as defined above; each $R_1$ may independently be the same or different, and is as defined above; and each Ar may independently be the same or different, and is a substituted or unsubstituted $C_6$-$C_{30}$ arylene radical, wherein the bonds are directly connected to an aromatic moiety. Suitable Ar groups in formula (S-2) may be derived from a $C_6$-$C_{30}$ dihydroxyarylene compound, or any combination of two or more of the dihydroxyarylene compounds. Specific examples of suitable dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (S-2) may be derived from the corresponding dihydroxy compound of formula (S-3):

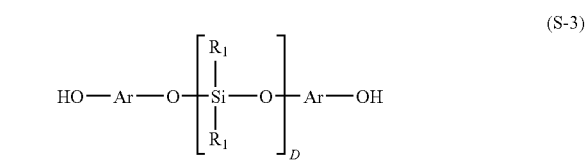
(S-3)

wherein $R_1$, Ar, and D are as described above. Compounds of formula (S-3) may be obtained by the reaction of a dihydroxyarylene compound with, for example, an alpha, omega-bisacetoxypolydiorganosiloxane under phase transfer conditions.

In another embodiment, polydiorganosiloxane blocks comprise units of formula (S-4):

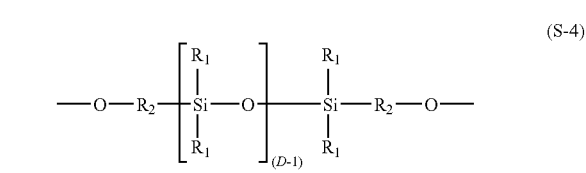
(S-4)

wherein $R_1$ and D are as described above, and each occurrence of $R_2$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (S-5):

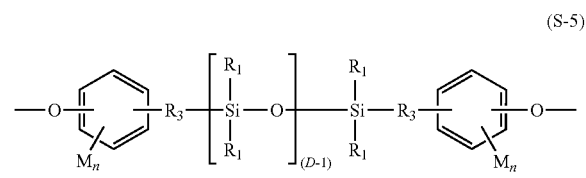
(S-5)

wherein $R_1$ and D are as defined above. Each $R_3$ in formula (S-5) is independently a divalent $C_2$-$C_8$ aliphatic group. Each M in formula (S-5) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R_3$ is a dimethylene, trimethylene or tetramethylene group; and $R_1$ is a $C_{1-8}$ alkyl, haloalkyl such as trifluoropropyl, cyanoalkyl, or aryl such as phenyl, chlorophenyl or tolyl. In another embodiment, $R_1$ is methyl, or a mixture of methyl and trifluoropropyl, or a mixture of methyl and phenyl. In still another embodiment, M is methoxy, n is one, $R_3$ is a divalent $C_1$-$C_3$ aliphatic group, and $R_1$ is methyl.

Units of formula (S-5) may be derived from the corresponding dihydroxy polydiorganosiloxane (S-6):

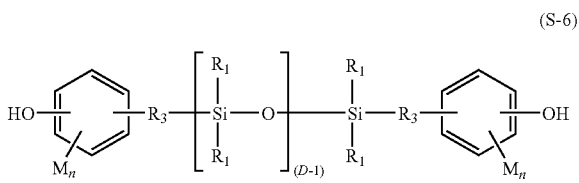

wherein R, D, M, $R_3$, and n are as described above. Such dihydroxy polysiloxanes can be made by effecting a platinum catalyzed addition between a siloxane hydride of formula (S-7):

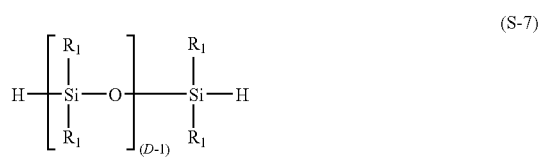

wherein $R_1$ and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In another embodiment, the polysiloxane-polycarbonate copolymer comprises from about 50 to about 99 weight percent of carbonate units and from about 1 to about 50 weight percent siloxane units. Within this range, the polysiloxane-polycarbonate copolymer may comprise from about 70 to about 98 weight percent, specifically from about 75 to about 97 weight percent of carbonate units and from about 2 to about 30 weight percent, specifically from about 3 to about 25 weight percent siloxane units, such as about 20 weight percent siloxane units.

In one specific embodiment, the polysiloxane-polycarbonate copolymer comprises polysiloxane units, and carbonate units derived from bisphenol A. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate copolymer can have a melt volume flow rate, measured at 300° C./1.2 kg, of 1 to 35 cubic centimeters per 10 minutes (cc/10 min), specifically 2 to 30 cc/10 min. Mixtures of polysiloxane-polycarbonates of different flow properties may be used to achieve the overall desired flow property.

Examples of suitable polysiloxane-polycarbonate copolymers which can be utilized herein include those described in U.S. Pat. No. 6,657,018, which is fully incorporated herein by reference. Also included are polysiloxane-polycarbonate copolymers having a larger number of polysiloxane units than those specifically mentioned in U.S. Pat. No. 6,657,018.

In one embodiment, the composition comprises a polysiloxane-polycarbonate copolymer, such as LEXAN® EXL (General Electric Co.). LEXAN® EXL is PC-Siloxane copolymer with 20 percent siloxane segments by weight. The resin composition comprises a polysiloxane-polycarbonate in an amount effective to maintain at least one mechanical property of the thermoplastic composition prepared therefrom, in the presence of further components. GE LEXAN® EXL product line with incorporated polysiloxane-polycarbonate copolymer has achieved great success in applications, such as for mobile phones and automotive.

It is believed that the particular proportions of the elastomer-modified graft copolymer and the polysiloxane-polycarbonate copolymer produce a synergistic effect and result in a polycarbonate product with significantly improved properties and characteristics, as disclosed in the present embodiments.

In an embodiment, MBS and PC-Si copolymer such as opaque LEXAN® EXL may be pre-blended with polycarbonate, and then the mixture extruded through twin screws under normal polycarbonate processing conditions.

Although the amount of the optional siloxane oligomer in this embodiment is generally from about 0.1 parts to about 5 parts by weight, specifically it can be from about 0.2 parts to about 3 parts by weight, and more specifically it can be from about 0.4 parts to about 1.6 parts, such as 0.8 parts by weight.

In an embodiment, the siloxane oligomer used in the flame retardant composition comprises a formula (P-1) compound:

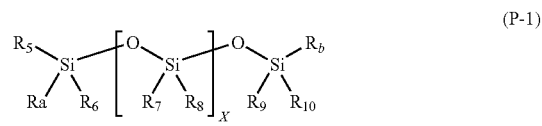

wherein $R_5$, $R_6$, $R_7$, $R_8$, $R_9$, $R_{10}$, $R_a$ and $R_b$ are independently selected from a $C_1$-$C_8$ alkyl group such as methyl and ethyl, or an arylalkyl group such as phenylmethyl, phenylethyl, and phenylpropyl, or an aryl group such as phenyl; x is an integer and $1 \leq x \leq 10$.

For example, in formula (P-1), $R_5$, $R_6$, $R_7$, $R_8$, $R_9$, and $R_{10}$ may all be methyl; $R_a$ and $R_b$ are phenylpropyl; and $3 \leq x \leq 4$. The component (iv) of the thermoplastic R composition therefore may be bi-phenylpropyl dimethicone (BPD) such as formula (P-2) compound:

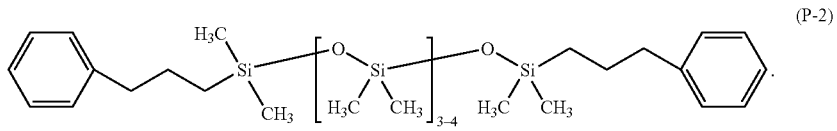

(P-2)

In a further embodiment, siloxane oligomer with Mw=564-638 may be obtained from GE Silicones (General Electric Co.) under the trade name of SF1555.

The polycarbonate of the composition can comprise repeating structural carbonate units of the formula (1):

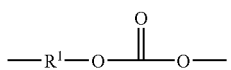

(1)

in which $R^1$ group may be selected from any aromatic radicals, alicyclic radicals, and aliphatic radicals. In an embodiment, at least 60 percent of the $R^1$ groups are aromatic organic radicals.

In a further embodiment, $R^1$ is an aromatic organic radical, for example a radical of the formula (2):

$$—A^1—Y^1—A^2—$$ (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

In another embodiment, the polycarbonate can comprise repeating structural carbonate units of the formula (A-1):

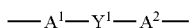

(A-1)

wherein $Y^1$, $A^1$ and $A^2$ are as described above.

In yet another embodiment, polycarbonates may be produced via the interfacial reaction of dihydroxy compounds having the formula HO—$R^1$—OH, which includes dihydroxy compounds of formula (3):

HO-$A^1$-$Y^1$-$A^2$-OH (3)

wherein $Y^1$, $A^1$ and $A^2$ are as described above.

In still another embodiment, polycarbonates may be produced via the interfacial reaction of bisphenol compounds of general formula (4):

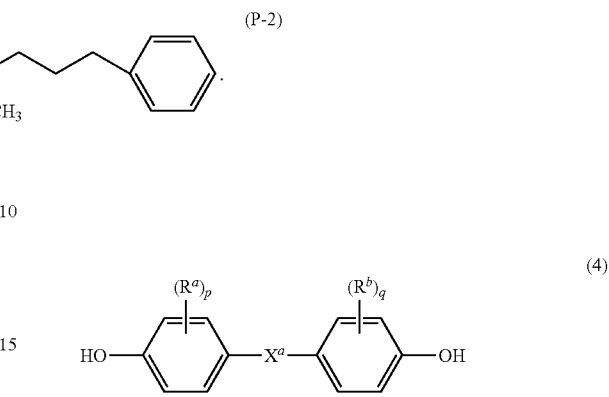

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

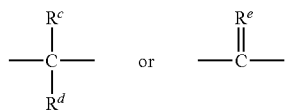

(5)

wherein $R^c$ and $R^d$ each independently represent a hydrogen atom or a monovalent linear or cyclic hydrocarbon group and $R^e$ is a divalent hydrocarbon group.

In yet a further embodiment, polycarbonates may be produced via the interfacial reaction of one or more bisphenol compounds of general formula (B-1):

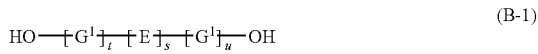

(B-1)

wherein each $G^1$ is independently at each occurrence a $C_6$-$C_{20}$ aromatic radical; E is independently at each occurrence a bond, a $C_3$-$C_{20}$ cycloaliphatic radical, a $C_3$-$C_{20}$ aromatic radical, a $C_1$-$C_{20}$ aliphatic radical, a sulfur-containing linkage, a selenium-containing linkage, a phosphorus-containing linkage, or an oxygen atom; "t" is a number greater than or equal to one; "s" is either zero or one; and "u" is a whole number including zero.

Some illustrative, non-limiting examples of suitable dihydroxy compounds include the following: resorcinol; $C_{1-3}$ alkyl-substituted resorcinols; 4-bromoresorcinol, hydroquinone, 4,4'-dihydroxybiphenyl, 1,6-dihydroxynaphthalene, 2,6-dihydroxynaphthalene, 1,1-bis(4-hydroxyphenyl) cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis[3-t-butyl-4-hydroxy-6-methylphenyl-1-(1-methylethylidine)] benzene; 1,4-bis[3-t-butyl-4-hydroxy-6-methylphenyl-1-(1-methylethylidine)]benzene; 4,4'-biphenol; 2,2',6,8-tetramethyl-3,3',5,5'-tetrabromo-4,4'-biphenol; 2,2',6,6'- tetramethyl-3,3',5-tribromo-4,4'-biphenol; 1,1-bis(4-hydroxyphenyl)-2,2,2-trichloroethane; 1,1-bis(4-hydroxyphenyl)-1-cyanoethane; 1,I-bis(4-hydroxyphenyl)dicyanomethane; I,I-bis(4-hydroxyphenyl)-1-cyano-1-phenylmethane; 2,2-bis(3-methyl-4-hydroxyphenyl)propane; 1,1-bis(4-hydroxyphenyl)norbornane; 3,3-bis(4-hydroxyphenyl)phthalide; 1,2-bis(4-hydroxyphenyl)ethane; 1,3-bis(4-hydroxyphenyl)propenone; bis(4-hydroxyphenyl)sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl) acetic acid; 2,4'-dihydroxydiphenylmethane; 2-bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5' tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexandiyl]bisphenol (1,3 BHPM); 4-[1-[3-(4-hydroxyphenyl)-4-methylcyclohexyl]-1-methyl-ethyl]-phenol (2,8BHPM); 3,8-dihydroxy-5a,10b-diphenylcoumarano-2',3',2,3-coumarane (DCBP); 2-phenyl-3,3-bis(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; 4,4' dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; bis(4-hydroxyphenyl)acetonitrile; bis(4-hydroxyphenyl)sulfoxide; bis(4-hydroxyphenyl)sulfone; 9,9-bis(4-hydroxyphenyl)fluorine; 2,7-dihydroxypyrene; 6,6'-dihydroxy-3,3,3',3' tetramethylspiro(bis)indane ("spirobiindane bisphenol"); 3,3-bis(4-hydroxyphenyl)phthalide; 2,6-dihydroxydibenzo-p-dioxin;

2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene; 2,7-dihydroxycarbazole, and the like, as well as combinations comprising at least one of the foregoing dihydroxy compounds.

Specific examples of the types of bisphenol compounds represented by formula (4) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl) butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl) propane, 3,3-bis(4-hydroxyphenyl)phthalimidine, 2-phenyl-3,3-bis(4-hydroxyphenyl)phthalimidine, 1,1-bis(4-hydroxyphenyl)-3,3,5-trimethylcyclohexane, and 1,1-bis(4-hydroxy-3-methylphenyl)cyclohexane. Combinations comprising at least one of the foregoing dihydroxy compounds may also be used.

In one embodiment, the polycarbonate can comprise repeating structural carbonate units of the formula (A-2):

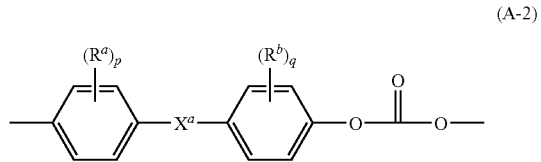

(A-2)

wherein p, q, $R^a$, $R^b$ and $X^a$ are as described above.

In another embodiment, the polycarbonate can comprise repeating structural carbonate units of the formula (A-3), i.e. BPA unit:

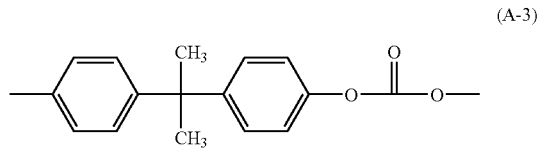

(A-3)

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of 0.05 to 2.0 weight percent of the polycarbonate. All types of polycarbonate end groups are contemplated as being useful in the polycarbonate, provided that such end groups do not significantly affect desired properties of the polycarbonate product.

The polycarbonates may have a weight average molecular weight (Mw) of from about 20,000 to about 37,000, more specifically from about 22,000 to about 30,000, and most specifically from about 22,000 to about 28,000, as measured by gel permeation chromatography (GPC) using a crosslinked styrene-divinyl benzene column, at a sample concentration of 1 milligram per milliliter, and as calibrated with polycarbonate standards.

In another embodiment, the component (i) of the flame retardant composition comprises a high flow PC, a normal flow PC (100 Grade PC), or a mixture thereof. The high flow PC may include, for example, bisphenol-A polycarbonate homopolymer having a molecular weight of about 21,600 to 22,200 (molecular weights are based on Gel Permeation chromatography measurements using polycarbonate standards). The normal flow PC may include, for example, bisphenol-A polycarbonate homopolymer having a molecular weight of about 29,500 to 30,300.

In one embodiment, a mixture of high flow PC and normal flow PC is used as the component (i). The weight ratio between the high flow PC and normal flow PC may be in the range of from about 5:95 to about 95:5, specifically from about 10:90 to about 90:10, and more specifically from about 20:80 to about 80:20.

In an embodiment, the polycarbonate has flow properties suitable for the manufacture of thin articles. Melt volume flow rate (often abbreviated MVR) measures the rate of extrusion of a thermoplastic through an orifice at a prescribed temperature and load. Polycarbonates suitable for the formation of thin articles may have an MVR, measured at 300° C./1.2 kg according to ASTM D1238-04, of 0.5 to 80 cubic centimeters per 10 minutes (cc/10 min). In a specific embodiment, a suitable polycarbonate composition has an MVR measured at 300° C./1.2 kg according to ASTM D1238-04, of 0.5 to 50 cc/10 min, specifically 1 to 25 cc/10 min, and more specifically 3 to 20 cc/10 min. Mixtures of polycarbonates of different flow properties may be used to achieve the overall desired flow property.

Polycarbonates of the disclosure may include copolymers comprising carbonate chain units and other units. A specific suitable copolymer is a polyester-polycarbonate, also known as a copolyester-polycarbonate and polyester-carbonate. Combinations of polycarbonates and polyester-polycarbonates may also be used. As used herein, a "combination" is inclusive of all mixtures, blends, alloys, reaction products, and the like.

However, the amount of polyester-polycarbonate and/or polyester in the composition should maintain such a low level that it causes no adverse effect on the FR property of the composition. For example, the amount of polyester-polycarbonate and/or polyester may be a trace amount, or may be as low as zero.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 11. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

A chain-stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain-stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain-stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

In one embodiment, the polyester-polycarbonates may be prepared by interfacial polymerization. Rather than utilizing a dicarboxylic acid, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. In one embodiment, an effective amount of a phase transfer catalyst may be 0.1 to 10 weight percent based on the weight of bisphenol in the phosgenation mixture. In another embodiment, an effective amount of phase transfer catalyst may be 0.5 to 2 weight percent based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

In a further embodiment, the composition comprises:
(i) 100 parts by weight of polycarbonate;
(ii) from about 0 to about 0.26 parts by weight of a fluoro-containing anti-drip agent;
(iii) from about $1 \times 10^{-4}$ parts to about 0.1 parts by weight of an aromatic sulfone sulfonate;
(iv) from about $1 \times 10^{-5}$ parts to about 0.1 parts by weight of an aromatic sulfonate;
(v) from about 0.1 parts to about 10 parts by weight of an elastomer-modified graft copolymer;
(vi) from about 0.1 parts to about 12 parts by weight of a polysiloxane-polycarbonate copolymer;
(vii) optionally from about 0.1 parts to about 5 parts by weight of a siloxane oligomer; and
(viii) one or more optional additives selected from the group consisting of hydrolysis stabilizer, filler/reinforcing agent, visual effect enhancer, antioxidant, heat stabilizer, light stabilizer, ultraviolet light absorber, plasticizer, mold release agent, lubricant, antistatic agent, pigment, dye, processing aid, radiation stabilizer; and combinations thereof;
wherein the fluorine content from the component (ii) anti-drip agent is less than about 0.1 percent by weight based on the total weight of the composition.

In various embodiments, additives ordinarily incorporated in the compositions are selected so as not to adversely affect the desired properties of the composition Mixtures of additives may be used. Such additives may be mixed at a suitable time during the mixing of the components for forming the composition The composition may comprise one or more hydrolysis stabilizers for reducing hydrolysis of ester and/or carbonate groups. Typical hydrolysis stabilizers may include carbodiimide-based additives such as aromatic and/or cycloaliphatic monocarbo-diimides substituted in position 2 and 2', such as 2,2',6,6'-tetraisopropyldiphenylcarbodiimide. Polycarbodiimides having a molecular weight of over 500 grams per mole are also suitable. Other compounds useful as hydrolysis stabilizers include an epoxy modified acrylic oligomers or polymers, and oligomers based on cycloaliphatic epoxides. Specific examples of suitable epoxy functionalized stabilizers include Cycloaliphatic Epoxide Resin ERL-4221 supplied by Union Carbide Corporation (a subsidiary of Dow Chemical), Danbury, Conn.; and JONCRYL® ADR-4300 and JONCRYL® ADR-4368, available from Johnson Polymer Inc., Sturtevant, Wis. When present, hydrolysis stabilizers can be used in amounts of 0.05 to 1 percent by weight, specifically 0.1 to 0.5 percent by weight, and more specifically 0.12 to 0.3 percent by weight, based on the weight of the polycarbonate used in the thermoplastic composition.

The composition may comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes;

Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. When present, pigments can be used in amounts of 0.01 to 10 percent by weight, based on the weight of the polycarbonate used in the thermoplastic composition.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. When present, dyes can be used in amounts of 0.01 to 10 percent by weight, based on the total weight of the polycarbonate used in the thermoplastic composition.

The thermoplastic composition may include fillers or reinforcing agents. Where used, suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, finite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. When present, fillers can be used in amounts of 0 to 90 percent by weight, based on the weight of the component (i) polycarbonate used in the thermoplastic composition.

Visual effect enhancers, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS # 522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead. When present, visual effect enhancers can be used in amounts of 0.01 to 10 percent by weight, based on the weight of the component (i) polycarbonate used in the thermoplastic composition.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-d i-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. When present, antioxidants can be used in amounts of 0.0001 to 1 percent by weight, based on the weight of the component (i) polycarbonate used in the thermoplastic composition.

In an embodiment, tris(2,4-di-tert-butylphenyl) phosphite (IRGAPHOS™ 168, Ciba-Geigy) was used as the antioxidants/stabilizer, the amount of which was from about 0.03 percent to about 0.05 percent by weight, based on the weight of the component (i) polycarbonate used in the thermoplastic composition.

Suitable heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. When present, heat stabilizers can be used in amounts of 0.0001 to 1 percent by weight, based on the weight of the component (i) polycarbonate used in the thermoplastic composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. When present, light stabilizers can be used in amounts of 0.0001 to 1 percent by weight, based on the weight of the component (i) polycarbonate used in the thermoplastic composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing UV absorbers. When present, UV absorbers can be used in amounts of 0.0001 to 1 percent by weight, based on the weight of the component (i) polycarbonate used in the thermoplastic composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. When present, such materials can be used in amounts of 0.001 to 1 percent by weight, specifically 0.01 to 0.75 percent by weight, more specifically 0.1 to 0.5 percent by weight, based on the weight of the component (i) polycarbonate used in the thermoplastic composition.

In an embodiment, octadecyl pentaerythritol tetrastearate (PETS), known as Loxiol from Henkel, was used as the mold release agent/lubricant, the amount of which was about 0.28 percent by weight, based on the weight of the component (i) polycarbonate used in the thermoplastic composition. PETS may be injected into an extruder via nozzles.

In an embodiment, PETS was used as the mold release agent/lubricant, the amount of which was about 0.42 percent by weight, based on the weight of the component (i) polycarbonate used in the thermoplastic composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat™ 6321 (Sanyo) or Pebax™ MH1657 (Atofina), Irgastat™ P18 and P22 (Ciba-Geigy). Other polymeric materials that may be used as antistatic agents are inherently conducting polymers such as polyaniline (commercially available as PANIPOL® EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. When present, antistatic agents can be used in amounts of 0.0001 to 5 percent by weight, based on the weight of the component (i) polycarbonate used in the thermoplastic composition.

Radiation stabilizers may also be present, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,2-cyclopentanediol, 1,2-cyclohexanediol, and the like; branched acyclic diols such as 2,3-dimethyl-2,3-butanediol (pinacol), and the like, and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol (hexylene glycol), 2-phenyl-2-butanol, 3-hydroxy-3-methyl-2-butanone, 2-phenyl-2-butanol, and the like, and cycoloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy substituted saturated carbon may be a methylol group ($-CH_2OH$) or it may be a member of a more complex hydrocarbon group such as would be the case with ($-CR^4HOH$) or ($-CR^4_2OH$) wherein $R^4$ is a complex or a simple hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, and polypropylene glycol. When present, radiation stabilizers are typically used in amounts of 0.001 to 1 weight percent, more specifically 0.01 to 0.5 weight percent, based on the weight of the component (i) polycarbonate used in the thermoplastic composition.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like. When present, processing aids can be used in amounts of 0.001 to 1 percent by weight, based on the weight of the component (i) polycarbonate used in the thermoplastic composition.

The thermoplastic composition may be manufactured by methods generally available in the art, for example, in one embodiment, in one manner of proceeding, powdered polycarbonate, and any optional additive(s) are first blended, in a HENSCHEL-Mixer® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic article comprises melt combining a polycarbonate, and any optional additive(s), to form a thermoplastic composition. The melt combining can be done by extrusion. In an embodiment, the proportions of polycarbonate, and any optional additive(s) are selected such that the optical properties of the thermoplastic composition are maximized while mechanical performance is at a desirable level.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

Shaped, formed, or molded articles comprising the compositions are also provided. The compositions may be molded into useful shaped articles by a variety of means such as injection molding, extrusion, rotational molding, blow molding and thermoforming. In a specific embodiment, molding is done by injection molding. Desirably, the thermoplastic composition has excellent mold filling capability and is useful to form electronic parts, mechanical parts and automobile parts.

Unless specified differently, the flame retardancy of the compositions disclosed herein was determined by UL 94 Flammability Testing standards. In this regard, there are generally two types of pre-selection test programs conducted by Underwriters Laboratory (UL) on plastic materials to measure flammability characteristics. The first determines the material's tendency either to extinguish or to spread the flame once the specimen has been ignited. This program is described in UL 94, The Standard for Flammability of Plastic Materials for Parts in Devices and Appliances, which is now harmonized with IEC 60707, 60695-11-10 and 60695-11-20 and ISO 9772 and 9773.

The second test program measures the ignition resistance of the plastic to electrical ignition sources. The material's resistance to ignition and surface tracking characteristics is described in UL 746A, which is similar to the test procedures described in IEC 60112, 60695 and 60950.

With respect to UL 94, there are 12 flame classifications specified therein that are assigned to materials based on the results of small-scale flame tests. These classifications, listed below in descending order of flammability, are used to distinguish a material's burning characteristics after test specimens have been exposed to a specified test flame under controlled laboratory conditions.

a. Six of the classifications relate to materials commonly used in manufacturing enclosures, structural parts and insulators found in consumer electronic products (5VA, 5VB, V-0, V-1, V-2, HB).

b. Three of the remaining six classifications relate to low-density foam materials commonly used in fabricating speaker grills and sound-deadening material (HF-1, HF-2, HBF).

c. The last three classifications are assigned to very thin films, generally not capable of supporting themselves in a horizontal position (VTM-0, VTM-1, VTM-2). These are usually assigned to substrates on flexible printed circuit boards.

During testing, specimens molded from the plastic material are oriented in either a horizontal or vertical position, depending on the specifications of the relevant test method, and are subjected to a defined flame ignition source for a specified period of time. In some tests, the test flame is only applied once, as is the case of the horizontal burning (HB) test, while in other tests the flame is applied twice or more.

A HB flame rating indicates that the material was tested in a horizontal position and found to burn at a rate less than a specified maximum. The three vertical ratings, V2, V1 and V0 indicate that the material was tested in a vertical position and self-extinguished within a specified time after the ignition source was removed. The vertical ratings also indicate whether the test specimen dripped flaming particles that ignited a cotton indicator located below the sample. UL 94 also describes a method in which the test flame is applied for up to five applications, in testing for a 5VA or 5VB classification. These small-scale tests measure the propensity of a material to extinguish or spread flames once it becomes ignited.

A more detailed explanation of the parameters for a UL 94 V0 flammability rating utilized herein is set forth below.

The disclosure is further illustrated by the following non-limiting examples.

EXAMPLES

Different amounts of flame retardant additives and polycarbonates were added together and pre-blended. In the following examples, the mold release agent was pentaethyritol tetrastearate, and the heat stabilizer was IRGAPHOS™ 168 (tris(2,4-di-t-butylphenyl) phosphite). Extrusion and molding was carried out under normal polycarbonate processing conditions. Flammability testing was conducted using the statistical "UL Tool" in which 5 bars, at the specified thickness, were burned using the UL94 test protocol and the total flame-out-time was calculated. The table below shows the criteria for V0, V1 and V2 under UL94 standards.

Flammability testing was conducted using the statistical "UL Tool" in which 5 bars, at the specified thickness, were burned using the UL94 test protocol and the total flame-out-time was calculated. The table below shows the criteria for V0, V1 and V2 under UL94 standards.

| Test type | 94 V0 | 94 V1 | 94 V2 |
| --- | --- | --- | --- |
| Each flame out time (t1 or t2) | <=10 s | <=30 s | <=30 s |
| Total afterflame time for 5specimen (t1 + t2) | <=50 s | <=250 s | <=250 s |
| Afterflame plus afterglow time for each specimen (t2 + t3) | <=30 s | <=60 s | <=60 s |
| Afterflame or afterglow up to the holding clamp | No | No | No |
| Cotton Ignited | No | No | Yes |

A set of experiments was performed using different formulations of polycarbonate with combinations of PC—Si copolymer and MBS with a halogen free flame retardant package (bi-phenylpropyl dimethicone (BPD), potassium diphenylsulfone sulfonate (KSS) and sodium toluene sulfonic acid (NaTS)). Since NaTS salts were in low loading, it was dissolved in DI water, and the aqueous solution was then dispersed into PC powder.

As shown in Table 1 below, those compositions with neither MBS nor PC-Si copolymer (LEXAN® EXL) (batch 1-1), either opaque PC-Si copolymer (LEXAN® EXL) (batch 1-2 and 1-3) or MBS (batch 1-4 and 1-5) alone, showed 100 percent dripping upon burning. Those compositions with the MBS and PC-Si copolymer combination (batch 1-6 through 1-10), on the other hand, showed less dripping upon burning. These results demonstrated a synergistic anti-dripping effect between these two copolymers.

TABLE 1

| | Batch 1-1 | Batch 1-2 | Batch 1-3 | Batch 1-4 | Batch 1-5 | Batch 1-6 | Batch 1-7 | Batch 1-8 | Batch 1-9 | Batch 1-10 |
| --- | --- | --- | --- | --- | --- | --- | --- | --- | --- | --- |
| High Flow PC | 30 | 30 | 30 | 30 | 30 | 30 | 30 | 30 | 30 | 30 |
| Normal Flow PC | 70 | 70 | 70 | 70 | 70 | 70 | 70 | 70 | 70 | 70 |
| STABILIZER | 0.03 | 0.03 | 0.03 | 0.03 | 0.03 | 0.03 | 0.03 | 0.03 | 0.03 | 0.03 |
| KSS | 0.035 | 0.035 | 0.035 | 0.035 | 0.035 | 0.035 | 0.035 | 0.035 | 0.035 | 0.035 |
| BPD | 0.8 | 0.8 | 0.8 | 0.8 | 0.8 | 0.8 | 0.8 | 0.8 | 0.8 | 0.8 |
| Opaque LEXAN ® EXL | | 3 | 1 | | | 1 | 3 | 3 | 1 | 2 |
| MBS | | | | 1 | 2.5 | 2.5 | 2.5 | 1 | 1 | 1.5 |
| 0.0625 percent NaTS solution | 0.16 | 0.16 | 0.16 | 0.16 | 0.16 | 0.16 | 0.16 | 0.16 | 0.16 | 0.16 |
| Drip @ 2.5 mm | 100 percent | 100 percent | 100 percent | 100 percent | 100 percent | 80 percent | 80 percent | 50 percent | 90 percent | 70 percent |

Upon combining some fluoro-containing anti-dripping additives at minimal amounts, such as TSAN or PTFE, robust thin wall flame retardance performance can be achieved. In this case, the content of fluoro can meet the Eco label requirement. Very interestingly, as shown in Table 2 below, the combination of MBS and PC-Si copolymer (LEXAN® EXL) with limited loading of TSAN (batch 2-4 to 2-6) can achieve robust UL94 V0 @ 1.2 mm performance. These compositions additionally meet the requirements of DIN/VDE Eco labels. Other compositions, on the other hand, cannot achieve UL94 V0 @ 1.2 mm.

TABLE 2

|  | Batch 2-1 | Batch 2-2 | Batch 2-3 | Batch 2-4 | Batch 2-5 | Batch 2-6 |
|---|---|---|---|---|---|---|
| High Flow PC | 85 | 85 | 85 | 85 | 85 | 85 |
| Normal Flow PC | 15 | 15 | 15 | 15 | 15 | 15 |
| STABILIZER | 0.05 | 0.05 | 0.05 | 0.05 | 0.05 | 0.05 |
| 10 g NaTS and 0.4 g KSS in 150 g DI water | 0.16 | 0.16 | 0.16 | 0.16 | 0.16 | 0.16 |
| TSAN | 0.26 | 0.26 | 0.26 | 0.26 | 0.26 | 0.26 |
| MBS |  | 1.5 |  | 1.5 | 2 | 1.5 |
| Opaque LEXAN ® EXL |  |  | 2 | 2 | 1.5 | 1.5 |
| BPD | 0.8 | 0.8 | 0.8 | 0.8 | 0.8 | 0.8 |
| UL 94 rating @ 1.2 mm | V2 | V2 | V2 | V0 | V0 | V0 |
| Total FOT of 5 bars | 39.3 | 29 | 45.4 | 32 | 21.1 | 22.4 |

Accordingly, it has been found that a combination of MBS and PC-Si copolymer (LEXAN® EXL) results in good anti-dripping and/or flame retardant effects. With KSS/NaTS combination as the flame retardant package and limited amounts of TSAN as co-antidripping additive (a loading within DIN/VDE requirement), the MBS-LEXAN® EXL combination results in robust UL94 V0 @ 1.2 mm. Without the MBS-PC-Si copolymer (LEXAN® EXL) combination, even UL94 V0 at a thickness of 1.5 mm cannot be achieved.

Furthermore, the combination of the polyorganosiloxane copolymer, such as opaque PC-Si copolymer (LEXAN® EXL) (up to 5 percent, such as 1-3 percent), and MBS (0.2 to 4 percent, such as 1-2.5 percent) demonstrated a synergy anti-dripping effect in flame retardant polycarbonate compositions (BPA-PC resins containing one or more flame retardant salts, such as salts of perfluorobutane sulfonic acid, diphenyl sulfone sulfonate, alkylphenyl sufonate, etc). Optionally, with limited loading of TSAN (thus conforming to Eco Labels), the combination of MBS and opaque PC-Si copolymer (LEXAN® EXL) can achieve robust thin wall flame resistive (V0 @ 1.2 mm).

The exemplary embodiment has been described with reference to the representative embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A composition comprising
(i) 100 parts by weight of polycarbonate;
(ii) from about 0 to about 0.26 parts by weight of an anti-drip agent;
(iii) from about $1 \times 10^{-4}$ parts to about 0.1 parts by weight of an aromatic sulfone sulfonate of Formula K-1:

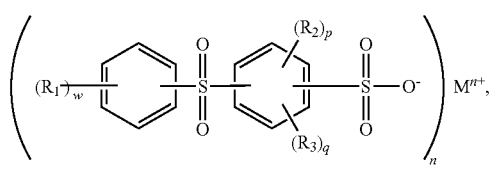

(K-1)

wherein $R_1$, $R_2$, and $R_3$ are independently selected from a $C_1$-$C_6$ alkyl group; M is a metal; n is an integer and $1 \leq n \leq 3$; w is an integer and $0 \leq w \leq 5$; p and q are integers, $p \geq 0$, $q \geq 0$, and $p+q \geq 4$;

(iv) from about $1 \times 10^{-5}$ parts to about 0.1 parts by weight of an aromatic sulfonate;
(v) from about 0.1 parts to about 10 parts by weight of an elastomer-modified graft copolymer;
(vi) from about 0.1 parts to about 12 parts by weight of a polysiloxane-polycarbonate copolymer, and
(vii) optionally from about 0.1 parts to about 5 parts by weight of a siloxane oligomer;
wherein the halogen content from the anti-drip agent is from 0 to less than about 0.1 percent by weight based on the total weight of the composition; and
wherein a molded sample of the composition has a UL 94 flammability V0 rating at 1.2 mm.

2. The composition according to claim 1, wherein the halogen content from the anti-drip agent is less than about 0.075 percent by weight based on the total weight of the composition.

3. The composition according to claim 2, wherein the halogen content from the anti-drip agent is less than about 0.05 percent by weight based on the total weight of the composition.

4. The composition according to claim 1, wherein the halogen-containing anti-drip agent comprises Teflon-grafted styrene-acrylonitrile copolymer (TSAN).

5. The composition according to claim 1, wherein the aromatic sulfone sulfonate comprises a formula (K-2) compound or potassium diphenylsulfone sulfonate (KSS):

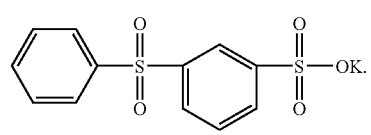

(K-2)

6. The composition according to claim 1, wherein the amount of the aromatic sulfone sulfonate is from about $5 \times 10^{-4}$ parts to about $7 \times 10^{-2}$ parts by weight.

7. The composition according to claim 1, wherein the aromatic sulfonate comprises a formula (N-1) compound:

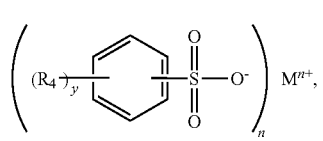

(N-1)

wherein $R_4$ is selected from a $C_1$-$C_6$ alkyl group; M is a metal; n is an integer and $1 \leq n \leq 3$; y is an integer and $0 \leq y \leq 5$.

8. The composition according to claim 1, wherein the aromatic sulfonate comprises a formula (N-2) compound or a sodium salt of toluene sulfonic acid (NaTS):

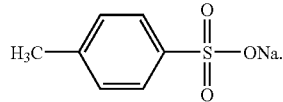

(N-2)

9. The composition according to claim 1, wherein the amount of the aromatic sulfonate is from about $5 \times 10^{-5}$ parts to about $5 \times 10^{-2}$ parts by weight.

10. The composition according to claim 1, wherein the elastomer-modified graft copolymer comprises a rubbery polymer substrate comprising an elastomeric copolymer of a polymer of monovinylaromatic monomers with a conjugated diene; and a rigid polymer grafted to the rubbery polymer substrate comprising a polymer of $C_{1-8}$ alkyl(meth)acrylate optionally with monovinylaromatic monomers.

11. The composition according to claim 10, wherein the elastomer-modified graft copolymer comprises methyl methacrylate-butadiene-styrene copolymer (MBS).

12. The composition according to claim 1, wherein the amount of the elastomer-modified graft copolymer is from about 0.5 parts to about 5 parts by weight.

13. The composition according to claim 1, wherein the polysiloxane-polycarbonate copolymer comprises repeating siloxane units of formula (S-1):

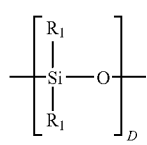

(S-1)

wherein each occurrence of $R_1$ is same or different, and is a $C_{1-13}$ monovalent organic radical; and D may have an average value of 2 to 1,000.

14. The composition according to claim 1, wherein the polysiloxane-polycarbonate copolymer comprises from about 2 weight percent to about 30 weight percent siloxane units.

15. The composition according to claim 1, wherein the amount of the polysiloxane-polycarbonate copolymer is from about 0.5 parts to about 6 parts by weight.

16. The composition according to claim 1, wherein the siloxane oligomer comprises a formula (P-1) compound:

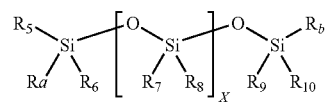

(P-1)

wherein $R_5$, $R_6$, $R_7$, $R_8$, $R_9$, $R_{10}$, $R_a$ and $R_b$ are independently selected from a $C_1$-$C_8$ alkyl group such as methyl and ethyl, or an arylalkyl group such as phenylmethyl, phenylethyl, and phenylpropyl, or an aryl group such as phenyl; x is an integer; and $1 \leq x \leq 10$.

17. The composition according to claim 1, wherein the siloxane oligomer comprises a formula (P-2) compound:

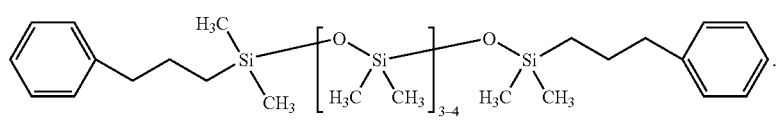

(P-2)

18. The composition according to claim 1, wherein the amount of the siloxane oligomer is from about 0.2 parts to about 3 parts by weight.

19. The composition according to claim 1, wherein the polycarbonate comprises repeating structural carbonate units of the formula (A-1):

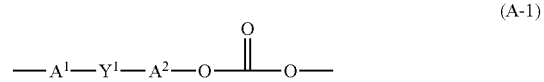

(A-1)

wherein each of $A^1$ and $A^2$ is a monocyclic divalent aryl radical and $Y^1$ is a bridging radical having one or two atoms that separate $A^1$ from $A^2$.

20. The composition according to claim 1, wherein the polycarbonate comprises repeating structural carbonate units of the formula (A-2):

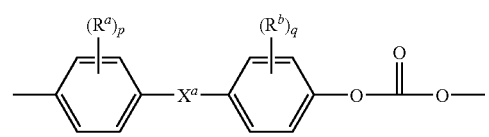

(A-2)

wherein $R^a$ and $R^b$ each represent a halogen atom or a monovalent hydrocarbon group and may be the same or different; p and q are each independently integers of 0 to 4; and $X^a$ represents one of the groups of formula (5):

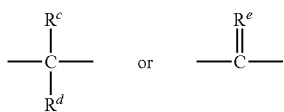

wherein $R^c$ and $R^d$ each independently represent a hydrogen atom or a monovalent linear or cyclic hydrocarbon group and $R^e$ is a divalent hydrocarbon group.

21. The composition according to claim 1, wherein the polycarbonate comprises repeating structural carbonate units of the formula (A-3):

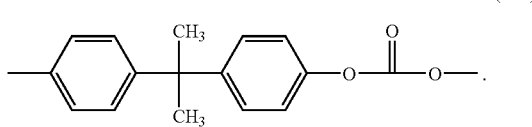

22. The composition according to claim 1, in which the polycarbonate comprises a mixture of high flow polycarbonate and normal flow polycarbonate.

23. The composition according to claim 1, further comprising one or more optional additives selected from the group consisting of hydrolysis stabilizer, filler/reinforcing agent, visual effect enhancer, antioxidant, heat stabilizer, light stabilizer, ultraviolet light absorber, plasticizer, mold release agent, lubricant, antistatic agent, pigment, dye, processing aid, radiation stabilizer; and combinations thereof.

24. The composition according to claim 1, further comprising from about 0.03 parts to about 0.05 parts by weight of tris(2,4-di-tert-butylphenyl) phosphite.

25. A flame retardant article made from the composition according to claim 1.

26. The article of claim 25, which is an electronic or a mechanical part.

27. A flame retardant article formed from a composition comprising an effective amount of a polycarbonate, a fluoro-containing anti-drip agent, an aromatic sulfone sulfonate, an aromatic sulfonate, a synergistic combination of an elastomer-modified graft copolymer and a polysiloxane-polycarbonate copolymer, and an optional siloxane oligomer, wherein the fluorine content of the anti-drip agent is less than about 0.1 percent by weight based on the total weight of the composition, and wherein the article exhibits a UL 94 flammability V0 rating at 1.2 mm.

* * * * *